United States Patent
Zhang et al.

(10) Patent No.: US 9,167,323 B2
(45) Date of Patent: Oct. 20, 2015

(54) METHOD AND SYSTEM FOR QUICKLY UPDATING RANGING RESULTS OF OPTICAL NETWORK UNIT BY OPTICAL LINE TERMINAL

(75) Inventors: Dezhi Zhang, Shenzhen (CN); Weiliang Zhang, Shenzhen (CN); Liquan Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 913 days.

(21) Appl. No.: 13/258,378

(22) PCT Filed: May 14, 2010

(86) PCT No.: PCT/CN2010/072799
§ 371 (c)(1),
(2), (4) Date: Sep. 21, 2011

(87) PCT Pub. No.: WO2011/012007
PCT Pub. Date: Feb. 3, 2011

(65) Prior Publication Data
US 2012/0114333 A1     May 10, 2012

(30) Foreign Application Priority Data
Jul. 30, 2009   (CN) .......................... 2009 1 0089974

(51) Int. Cl.
*H04B 10/00*     (2013.01)
*H04Q 11/00*     (2006.01)
(Continued)

(52) U.S. Cl.
CPC ........... *H04Q 11/0067* (2013.01); *H04J 3/0682* (2013.01); *H04J 3/14* (2013.01); *H04Q 2011/0079* (2013.01)

(58) Field of Classification Search
CPC . H04J 3/0682; H04J 14/0282; H04J 14/0291; H04J 3/14; H04J 2203/006; H04Q 2011/0083; H04B 10/032; H04B 10/272; H04B 10/03; H04B 10/07; H04B 10/0795; H04L 43/0852; H04L 45/22

USPC ............ 398/2, 5, 7, 8, 25, 34, 35, 58, 66, 67, 398/68, 70–72, 33, 53, 161, 165
See application file for complete search history.

(56) References Cited

U.S. PATENT DOCUMENTS 6,771,908 B2 *  8/2004  Eijk et al. ......................... 398/66
6,778,781 B2 *  8/2004  Van Eijk et al. .............. 398/100
(Continued)

FOREIGN PATENT DOCUMENTS

CN     1479460 A      3/2004
CN     101150361 A    3/2008
(Continued)

OTHER PUBLICATIONS

International Search Report in international application No. PCT/CN2010/072799, mailed on Aug. 19, 2010.
(Continued)

*Primary Examiner* — Hibret Woldekidan
(74) *Attorney, Agent, or Firm* — Oppedahl Patent Law Firm LLC (57) ABSTRACT

The disclosure provides a method for quickly updating ranging results of optical network units by an optical line terminal. The method comprises the following steps: an Optical Line Terminal (OLT) distributes an acquired ranging difference to all the Optical Network Units (ONUs); and the current ONU implements quick updating of the ranging result of the current ONU itself according to the acquired ranging difference. The disclosure also provides a system for quickly updating ranging results of ONUs by an OLT, wherein a distributing unit in the OLT is used for distributing an acquired ranging difference to all the ONUs; an updating unit in the ONU is used for implementing quick updating of ranging result of the current ONU itself according to the acquired ranging difference. the method and system of the disclosure can save the quantity of messages, enable quick switching in protection status, thus implementing protection switching efficiently.

13 Claims, 2 Drawing Sheets

(51) Int. Cl.
*H04J 3/06* (2006.01)
*H04J 3/14* (2006.01)

(56) References Cited

U.S. PATENT DOCUMENTS

| | | | |
|---|---|---|---|
| 6,868,232 B2* | 3/2005 | Eijk et al. | 398/5 |
| 8,515,276 B2* | 8/2013 | Zheng | 398/5 |
| 8,554,075 B2* | 10/2013 | Mizutani et al. | 398/5 |
| 8,600,228 B2* | 12/2013 | Rafel Porti et al. | 398/5 |
| 8,818,201 B2* | 8/2014 | Healey | 398/168 |
| 8,855,491 B2* | 10/2014 | Elmoalem et al. | 398/71 |
| 8,873,960 B2* | 10/2014 | Dvir et al. | 398/71 |
| 2002/0109876 A1 | 8/2002 | Eijk | |
| 2002/0114028 A1* | 8/2002 | Eijk et al. | 359/110 |
| 2004/0033077 A1 | 2/2004 | Kim | |
| 2010/0098407 A1* | 4/2010 | Goswami et al. | 398/5 |
| 2012/0070147 A1* | 3/2012 | Mizutani et al. | 398/25 |
| 2012/0230675 A1* | 9/2012 | Zhang et al. | 398/25 |

FOREIGN PATENT DOCUMENTS

| | | | | |
|---|---|---|---|---|
| CN | 101378311 A | * | 3/2009 | H04L 1/22 |
| CN | 101557539 A | | 10/2009 | |
| EP | 1231812 A2 | | 8/2002 | |
| JP | 2002344361 A | | 11/2002 | |
| KR | 20080002217 A | | 1/2008 | |

OTHER PUBLICATIONS

English Translation of the Written Opinion of the International Search Authority in international application No. PCT/CN2010/072799, mailed on Aug. 19, 2010.

Redun Dancy and Protection-Switching in APON Systems Jan. 1, 1999.

Proposal of a new protection mechanism for ATM PON interface Jun. 11, 2001.

Supplementary European Search Report in European application No. 10803840.7, mailed on Jul. 31, 2012.

International Search Report in international application No. PCT/CN2010/078962, mailed on Mar. 3, 2010.

English Translation of the Written Opinion of the International Search Authority in international application No. PCT/CN2010/078962, mailed on Mar. 3, 2010.

* cited by examiner

METHOD AND SYSTEM FOR QUICKLY UPDATING RANGING RESULTS OF OPTICAL NETWORK UNIT BY OPTICAL LINE TERMINAL

TECHNICAL FIELD

The disclosure relates to the field of communications, particularly to a method and system for quickly updating ranging results of Optical Network Units (ONUs) by an Optical Line Terminal (OLT) in a Passive Optical Network (PON) system under a protection state.

BACKGROUND

Figure 1:
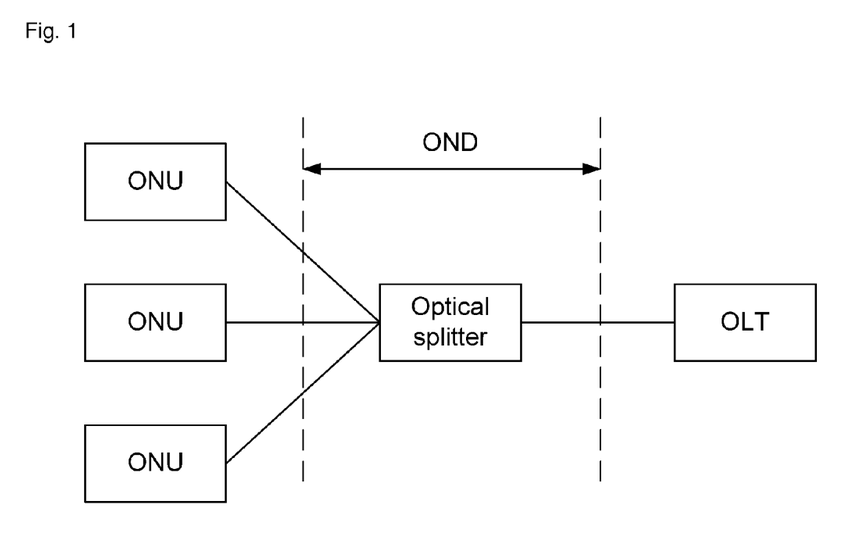
FIG. 1 is a diagram illustrating the architecture of an existing PON.

With the development of wideband access technologies, operators gradually accept and deploy an Optical Access Network (OAN) to provide service of faster rate and higher quality for users. A PON is a point-to-multipoint optical access technology. As shown in FIG. 1, the PON is composed of an OLT, ONUs and an Optical Distribution Network (ODN) where an optical splitter is located, and one OLT is connected with a plurality of ONUs through the ODN at the same time. Wherein the ONU can be terminals of various forms, including an Optical Network Terminal (ONT) used for family users, a Multi-Dwelling Unit (MDU) used for multi-dwelling users, and a business user type ONU used for various commercial occasions and residential users.

As shown in FIG. 1, in practical deployment, the distances between the ONUs and the OLT will change along with the actual physical placement locations of the ONUs, some are near and some are far. Considering such circumstances, in the PON system based on a Time-Division Multiple Address (TDMA) technology, the ONUs with different physical distances to the OLT are required to be regulated to be equidistant to the OLT in logical sequence, therefore, conflict is avoided when the OLT distributes an uplink time slot to each ONU, and all the ONUs can send data on the uplink according to the time slot arrangement of the OLT. The means of regulating the ONUs to be equidistant to the OLT is to calculate an equalization delay signal corresponding to each ONU based on different distances between all the ONUs to the OLT, and then each ONU, when transmitting data on the uplink, can adds the corresponding delay based on the equalization delay signal corresponding to the ONU itself, so that it can be ensured that the conflict resulting from transmitting data by the ONUs on the uplink is avoided.

At present, in the existing standard of G bit Passive Optical Network (GPON), the equalization delay signal is transmitted by the OLT through a Ranging_time message when the ONUs are in an O4 state, namely in a ranging state, Here, the Ranging_time message belongs to a Physical Layer Operation Administration and Maintenance (PLOAM) message. The OLT may transmit a Ranging_time message to each ONU for three times after measuring the distance of the ONU, wherein an equalization delay signal corresponding to the ONU is included in the Ranging_time message; and the ONU performs follow-up corresponding processing after receiving the Ranging_time message. With the method, operations can be performed well under normal conditions, but a problem occurs in a trunk optical fiber protection mode.

Figure 2:
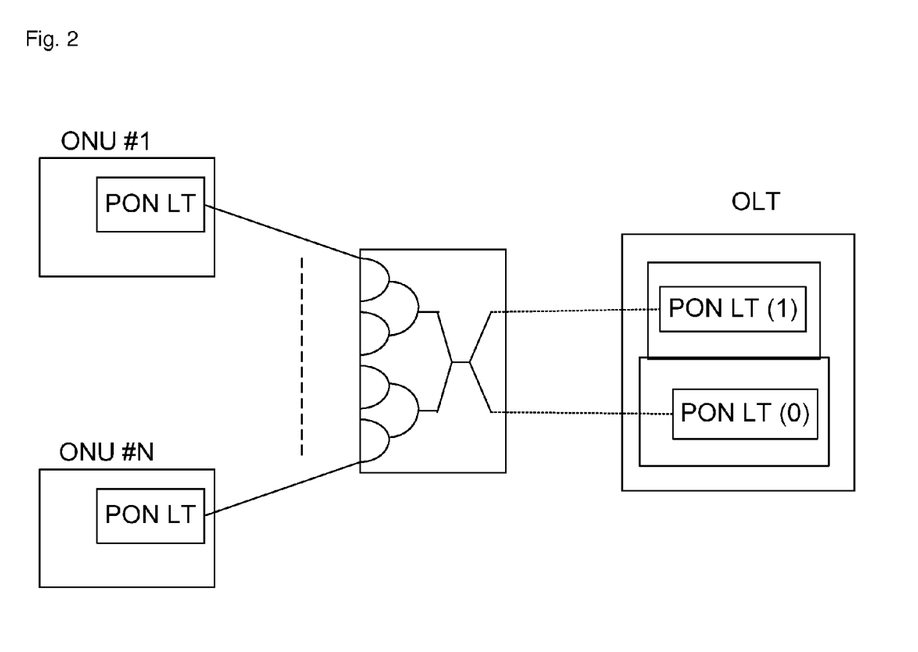
FIG. 2 is a diagram illustrating the architecture of a protection network in a trunk optical fiber protection mode.

In the application of PON deployment, some types of users require higher security and hope that operators can provide a security mechanism to ensure that the service channels are not interrupted, or require secondarily that, the service channels can restore quickly as soon as the service channels are interrupted. Therefore, protection and quick switching are required on the PON which bears the operation of user service, and PON protection mode needs to be adopted. In the PON protection mode, the OLT is connected with multiple ONUs through one or more optical splitters; there can be at least one optical interface on the OLT; a channel that each optical interface is connected with each ONU through the optical splitter is called as a protection channel, namely, there are at least one protection channel on the OLT; and the protection channels are divided into a primary channel and a standby channel in general. FIG. 2 is a diagram illustrating the architecture of an existing typical protection network adopting a PON protection mode in a trunk optical fiber protection mode; As shown in FIG. 2, the channel corresponding to optical interface PON LT (0) is a primary channel, and the channel corresponding to optical interface PON LT (1) is a standby channel.

In the trunk optical fiber protection mode, if the protection mode is triggered, all the ONUs are required to be switched to the channel corresponding to the standby OLT. On the basis of the difference of physical positions of the primary OLT and the standby OLT, each ONU is required to update the equalization delay signal, and the updated equalization delay signal should correspond to the physical distance between the ONU and the standby OLT, that is to say, each ONU can continue working normally only after being regulated to be logically equidistant to the standby OLT, so that conflict on the uplink can be avoided.

Following the mode defined in the existing GPON standard, the equalization delay signal corresponding to each ONU connected with the OLT is calculated at the OLT side, and then the OLT notifies all the ONUs connected with the OLT of the equalization delay signal corresponding to each ONU through the Ranging_time messages; and in order to ensure the transmission reliability of the equalization delay signal, the Ranging_time messages need to be transmitted for three times. Since it takes 125 us to transmit the message each time, when the number of the ONUs supported by the OLT reaches 128, it takes 125×3×128 us=48 ms to notify ONUs of the corresponding equalization delay signal just through transmitting the Ranging_time messages, furthermore, before the Ranging_time messages are transmitted under an O4 state, time is spent by the OLT for the ranging of the standby OLT and the ONU, so that the requirement of performing service switching within 50 ms cannot be satisfied basically. Therefore, for the service terminal, the protection effect of protection switching of the practical primary/ standby OLT cannot be embodied. In sum, in the trunk optical fiber protection mode, if the existing method above is adopted, the OLT needs to transmit an equalization delay signal corresponding to each ONU to the ONU only through a one-to-one communication mode, so that the quantity of message is too large, and requirement of performing service switching within 50 ms cannot be satisfied basically; therefore, protection switching cannot be implemented effectively in effect.

SUMMARY

In view of this, the disclosure aims to provide a method and system for quickly updating ranging results of ONUs by an OLT, which saves information, and can realize quick switching in a protection mode, so that protection switching is realized effectively.

In order to achieve the above-mentioned purposes, the technical solution of the disclosure is implemented as follows.

A method for quickly updating ranging results of Optical Network Units (ONUs) by an Optical Line Terminal (OLT), comprises:

distributing an acquired ranging difference to all the ONUs by the OLT; and implementing quick updating of ranging result of a current ONU itself by the current ONU according to the acquired ranging difference.

Wherein the ranging difference may comprise a round trip delay ranging difference $RTD_A$ between a primary channel and a standby channel.

Wherein under the condition that the ONU is in a ranging state after protection switching is triggered, the method may further comprise: distributing the $RTD_A$ to all the ONUs by the OLT in the form of a broadcast message.

Wherein when the primary channel is switched to the standby channel, the process of implementing quick updating of the ranging result of the current ONU itself according to the $RTD_A$ may comprise: obtaining a current equalization delay signal corresponding to the standby channel according to the $RTD_A$ and an equalization delay signal corresponding to the primary channel before, and updating the equalization delay signal; and when the standby channel is switched to the primary channel, the process of implementing quick updating of the ranging result of the current ONU itself according to the $RTD_A$ may comprise: obtaining a current equalization delay signal corresponding to the primary channel according to the $RTD_A$ and an equalization delay signal corresponding to the standby channel before, and updating the equalization delay signal.

Wherein under the condition that the ONU is in a normal working state, the method may further comprise: distributing the $RTD_A$ to all the ONUs by the OLT in the form of a broadcast message.

Wherein the process of implementing quick updating of the ranging result of the current ONU itself according to the $RTD_A$ may comprise: obtaining a current equalization delay signal corresponding to the standby channel in advance according to the $RTD_A$ and an equalization delay signal corresponding to the primary channel before, and updating a management information base; and enabling the updated equalization delay signal after the protection switching from the primary channel to the standby channel is triggered; or the process of implementing quick updating of the ranging result of the current ONU itself according to the $RTD_A$ may comprise: obtaining a current equalization delay signal corresponding to the primary channel in advance according to the $RTD_A$ and an equalization delay signal corresponding to the standby channel before, and updating a management information base; and enabling the updated equalization delay signal after the protection switching from the standby channel to the primary channel is triggered.

Wherein the broadcast message may comprise a modified Ranging_time message or a custom dedicated message.

A system for quickly updating ranging results of Optical Network Units (ONUs) by an Optical Line Terminal (OLT), comprises a distributing unit and an updating unit, wherein the distributing unit is configured to distribute an acquired ranging difference to all the ONUs by an OLT; and the updating unit is configured to implement quick updating of ranging result of a current ONU itself by the current ONU according to the acquired ranging difference.

Wherein the distributing unit may be further configured to distribute an acquired $RTD_A$ to all the ONUs by the OLT; wherein the $RTD_A$ may comprise a round trip delay ranging difference between a primary channel and a standby channel.

Wherein the distributing unit may be further configured to distribute the $RTD_A$ to all the ONUs in the form of a broadcast message by the OLT under the condition that the ONU is in a ranging state after protection switching is triggered.

Wherein the updating unit may be further configured to obtain a current equalization delay signal corresponding to the standby channel according to the $RTD_A$ and an equalization delay signal corresponding to the primary channel before under the state of switching from the primary channel to the standby channel, and update the equalization delay signal; or the updating unit may be further configured to obtain a current equalization delay signal corresponding to the primary channel according to the $RTD_A$ and an equalization delay signal corresponding to the standby channel before under the state of switching from the standby channel to the primary channel, and update the equalization delay signal.

Wherein the distributing unit may be further configured to distribute the $RTD_A$ to all the ONUs in the form of a broadcast message by the OLT under the condition that the ONU is in a normal working state.

Wherein the updating unit may be further configured to obtain a current equalization delay signal corresponding to the standby channel in advance according to the $RTD_A$ and an equalization delay signal corresponding to the primary channel before, and update a management information base; and enable the updated equalization delay signal after the protection switching from the primary channel to the standby channel is triggered; or the updating unit may be further configured to obtain a current equalization delay signal corresponding to the primary channel in advance according to the $RTD_A$ and an equalization delay signal corresponding to the standby channel before, and update a management information base; and enable the updated equalization delay signal after the protection switching from the standby channel to the primary channel is triggered.

In the disclosure the OLT distributes the acquired ranging difference to all the ONUs; and the current ONU implements quick updating of the ranging result of the current ONU itself according to the acquired ranging difference.

With the disclosure, the distributed ranging difference is the same to all the ONUs, so that the one-to-all communication mode can be adopted for sending messages; therefore, the quantity of messages is saved, the message sending process is simplified, a period of time during which all the ONUs restore to a normal working state is shortened and measured in the order of the millisecond, quick switching can be realized under the protection mode, and protection switching can be realized effectively.

DETAILED DESCRIPTION

The basic thought of the disclosure is that: an OLT distributes the acquired $RTD_A$ to all the ONUs, and ranging results of the ONUs are updated quickly by the ONUs according to the $RTD_A$.

Below the implementation of the technical solution is further illustrated in detail in combination with the drawings.

Figure 3:
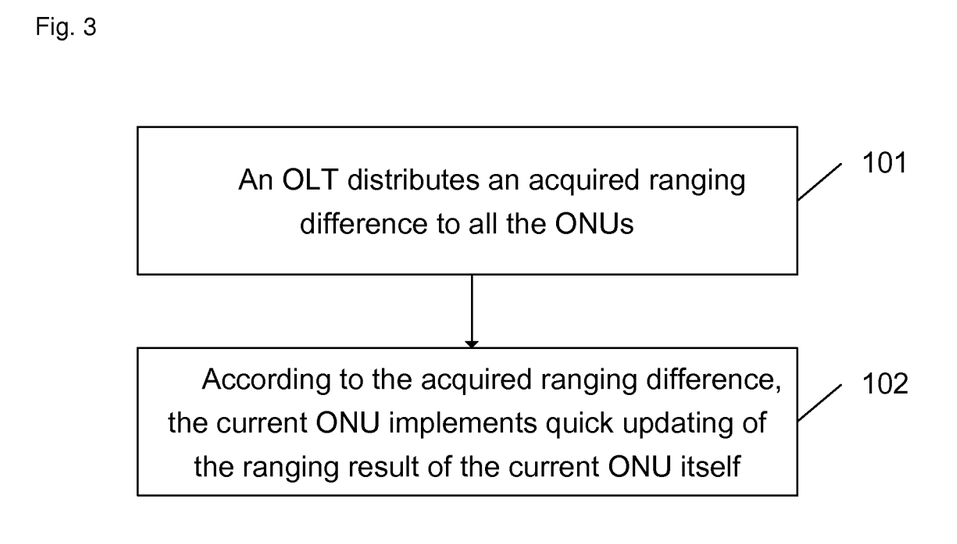
FIG. 3 is a diagram illustrating the implementation process of a method according to the disclosure.

As shown in FIG. 3, a method for quickly updating ranging results of ONUs by an OLT comprises the steps as follows.

Step 101: an OLT distributes the acquired ranging difference to all the ONUs.

Wherein the ranging difference can be $RTD_A$ which is a round trip delay ranging difference between a primary channel and a standby channel. $RTD_A = RTD_{primary} - RTD_{standby}$, where $RTD_{primary}$ is the value of a round trip delay of the primary channel, and $RTD_{standby}$ is the value of a round trip delay of the standby channel.

Step 102: a current ONU implements quick updating of the ranging result of the current ONU itself according to the acquired ranging difference.

Here, the current ONU refers to the ONU acquiring the ranging difference. It must be pointed out that not all the ONUs implements quick updating immediately at the same time, but the current ONU which has acquired the ranging difference implements quick updating of the ranging result of the current ONU itself according to the ranging difference, and other ONUs can implements quick updating of the ranging results according to the ranging difference only after the ONUs acquire the ranging difference.

For the technical solution consisting of step 101 and step 102, after step 102 is executed, on the basis of quick updating of ranging results, the time requirement of service switching can be satisfied, so that protection switching can be accomplished quickly.

Since the ONUs acquire $RTD_A$ at different times, the quick updating of ranging results of the ONUs is implemented differently, which is elaborated in two situations below.

One situation is that the ONUs are in a ranging state after protection switching is triggered.

Step 101 specifically comprises: under the condition that the ONUs are in a ranging state after protection switching is triggered, the OLT distributes the $RTD_A$ to all the ONUs in the form of a broadcast message.

When protection switching is switched from the primary channel to the standby channel, step 102 specifically comprises: a current equalization delay signal corresponding to the standby channel is obtained according to the $RTD_A$ and an equalization delay signal corresponding to the primary channel before, and the equalization delay signal is updated. At this moment, the formula of $Eqd_{standby} = Eqd_{primary} + RTD_A$ can be adopted, where $Eqd_{standby}$ is an equalization delay signal corresponding to the standby channel, and $Eqd_{principal}$ is an equalization delay signal corresponding to the primary channel; and $Eqd_{standby}$ and $Eqd_{primary}$ mentioned below are both the same as above in meaning, which is not repeated.

When protection switching is switched from the standby channel to the primary channel, step 102 specifically comprises: a current equalization delay signal corresponding to the primary channel is obtained according to the $RTD_A$ and an equalization delay signal corresponding to the standby channel before, and the equalization delay signal is updated. At this moment, the formula of $Eqd_{primary} = Eqd_{standby} + RTD_A$ can be adopted.

The other situation is that protection switching is not triggered when the ONUs are in a normal working state.

Step 101 specifically comprises: under the condition that the ONUs are in a normal working state, measurement can be performed in advance, so that an updated equalization delay signal can be adopted directly when a failure results in the triggering of protection switching. As soon as the time arrives, the OLT distributes the $RTD_A$ to all the ONUs in the form of a broadcast message.

A specific processing procedure of step 102 can comprise the following steps.

Step 1021a: a current equalization delay signal corresponding to the standby channel is obtained in advance according to the $RTD_A$ and the prior equalization delay signal corresponding to the primary channel, and a management information base is updated. At this moment, the formula of $Eqd_{standby} = Eqd_{primary} + RTD_A$ can be adopted.

Step 1022a: when the protection switching from the primary channel to the standby channel is triggered, the updated equalization delay signal is enabled.

Another specific processing procedure of step 102 can comprise the following steps.

Step 1021b: a current equalization delay signal corresponding to the primary channel is obtained in advance according to the $RTD_A$ and the prior equalization delay signal corresponding to the standby channel, and a management information base is updated. At this moment, the formula of $Eqd_{primary} = Eqd_{standby} + RTD_A$ can be adopted.

Step 1022b: when the protection switching from the standby channel to the principal channel is triggered, the updated equalization delay signal is enabled.

It should be pointed out that the broadcast message mentioned above comprises a modified Ranging_time message or a custom dedicated message.

Wherein the format of the modified Ranging_time message is shown in table 1 below:

TABLE 1

| Ranging_time message | | |
|---|---|---|
| Byte | Content of the byte | Meaning of the byte |
| 1 | ONU identification or 11111111 | As a unicast message, it is set into ONU-ID here, and the value of ONU-ID is unequal to 0xFF.<br><br>As a broadcast message distributed to all the ONUs, it is set into 0xFF here. |
| 2 | 00000100 | It indicates that the message type is 'Ranging_time' |
| 3 | 00000cab | a: '0'—the content of bytes 4 to 7 is EqD.<br>'1'—the content of bytes 4 to 7 is $RTD_A$.<br>b: '0'—indicates that the parameter included in the message is EqD of the primary channel.<br>'1'—indicats that the parameter included in the message is EqD of the standby channel.<br>c: it is valid when the value of a is 1, which indicates the positive and negative of $RTD_A$.<br>0—indicates negative value;<br>1—indicates positive value. |
| 4 | dddddddd | Top bit of EqD or $RTD_A$ |
| 5 | dddddddd | |
| 6 | dddddddd | |
| 7 | dddddddd | Lowest bit of EqD or $RTD_A$ |
| 8-12 | Unspecified | |

Here, what should be point out about table 1 is as follows: firstly, when byte 1 is set into 0xFF, bytes 4 to 7 contains the absolute value of the $RTD_A$; when byte 1 is set to be unequal to 0xFF, bytes 4 to 7 contains the value of EqD or $RTD_A$, and the positive and the negative of the value are identified with indicator bit a in byte 3; secondly, the unit of EqD or $RTD_A$ is bit; and thirdly, the Ranging_time message is used for distributing EqD of a working channel and that of a protection channel, or $RTD_A$ applied to the protection switching process to the ONUs. Besides, bytes 8 to 12 in table are is unspecified, which indicate reserved bit that is not specified or explained.

If the modified Ranging_time message shown in table 1 is adopted, when the first byte is 0xFF, the message is a broadcast message, but when the first byte is not equal to 0xFF, the message is a unicast message. The third byte is an indicating bit, and the 4$^{th}$ to 7$^{th}$ bytes are filled with specific indication content according to the indication of the indicating bit.

If a custom dedicated message is adopted, then the parameter RTD$_A$ is transmitted to the ONU through a newly-defined PLOAM message.

In sum, the disclosure mainly comprises that the disclosure is not limited to the network structure shown in FIG. 2, and the OLT may comprise at least one primary channel and/or at least one standby channel. In the disclosure, the method for quickly updating ranging results of the ONUs can be used for switching from the primary channel to the standby channel as well as switching from the standby channel to the principal channel.

In the prior art, if the protection mode is triggered, all the ONUs need to be switched to the channel corresponding to the standby OLT. Each ONU is required to update the equalization delay signal and can continue working normally after being regulated to be logically equidistant to the standby OLT so as to avoid conflict on the uplink. The standby OLT calculates the equalization delay signal corresponding to each ONU mainly based on the ranging process defined in the existing standard, namely the value of the round trip delay between the ONU and the OLT. Accordingly, both the primary channel and the standby channel of each ONU have corresponding values of the round trip delays, namely, RTD$_{primary}$ and RTD$_{standby}$. In the trunk optical fiber protection mode, the difference RTD$_A$ between the RTD$_{primary}$ and the RTD$_{standby}$ is the same to all the ONUs and is related to a trunk optical fiber length difference between the primary channel and the standby channel, namely fiber length difference between the OLT and the optical splitter, and unrelated to a fiber length of a branch fiber, namely fiber length between the optical splitter and the ONUs; besides, RTD$_A$=RTD$_{primary}$−RTD$_{standby}$. Therefore, in the trunk optical fiber protection mode, the RTD$_A$ is the same to all the ONUs. In the prior art, the OLT originally needs to calculate the equalization delay signal corresponding to each ONU according to the RTD$_A$, and then distributes the equalization delay signal corresponding to each ONU to the corresponding ONU through a one-to-one communication mode; however, in the disclosure, the RTD$_A$ is the same to all the ONUs, the RTD$_A$ can be obtained from the OLT through a one-to-all communication mode, and then each ONU can calculate the equalization delay signal corresponding to the ONU itself, wherein the calculation formula is derived as follows, and the formula of Eqd$_{standby}$=Eqd$_{primary}$+RTD$_A$ is derived. In the formula below, T$_{eqd}$ is a fixed value set by the OLT.

Eqd$_{standby}$=T$_{eqd}$−[RTD$_{primary}$−RTD$_A$]

RTD$_{primary}$=T$_{eqd}$−Eqd$_{primary}$

Eqd$_{standby}$=T$_{eqd}$−[T$_{eqd}$−Eqd$_{primary}$−RTD$_A$]= Eqd$_{primary}$+RTD$_A$ Here, it should be pointed out that Eqd$_{principal}$ is a parameter used by the ONU before protection switching is performed, and the ONU can still acquire the value after is protection is triggered to be switched into the standby channel, wherein the value is stored in the ONU. For the RTD$_A$, in the trunk optical fiber protection mode, the RTD$_A$ is the same to all the ONUs. Therefore, the OLT can distribute the parameter RTD$_A$ of EqD corresponding to each ONU originally calculated in the OLT to each ONU in the form of a broadcast PLOAM message, and each ONU can calculate the Eqd parameter of a standby channel corresponding to each ONU according to the formula of Eqd$_{standby}$=Eqd$_{primary}$+RTD$_A$.

Embodiment 1 an ONU is in a ranging state after protection switching is triggered. In the embodiment, the process of quickly updating ranging results of the ONUs specifically comprises the following steps.

Step 201: when in an O4 state, namely in a ranging state, an ONU wait for a corresponding equalization delay signal sent by a standby OLT.

Step 202: the standby OLT acquires RTD$_A$ related to a trunk optical fiber length difference between a primary channel and a standby channel according to the prior art.

Step 203: the OLT transmits a Ranging_time message modified for three times to all the ONUs in the form of a broadcast message, wherein the Ranging_time message comprises the RTD$_A$.

Step 204: the ONU calculates an equalization delay signal corresponding to the standby channel through the formula of Eqd$_{standby}$=Eqd$_{primary}$+RTD$_A$ according to the RTD$_A$ included in the received Ranging_time message and an equalization delay signal corresponding to the primary channel which is used by the ONU originally.

Here, the equalization delay signal corresponding to the primary channel is the equalization delay signal locally stored in the ONUs before and used originally before protection switching is performed. The equalization delay signal stored before is updated through the calculated equalization delay signal corresponding to the standby channel, so that quick updating of ranging results can be implemented. On the basis of quick updating of ranging results, the time requirement of service switching can be satisfied, so that protection switching can be accomplished quickly.

Step 205: after quick updating of ranging results is implemented and protection switching is accomplished, the ONUs enter an O5 state, namely enter a normal working state.

In the prior art, before the switching of the standby channel of the standby OLT and an ONU is not enabled, ranging of the standby channel is carried out in the normal working state of the ONU, so that the RTD$_A$ can be acquired. Therefore, related parameters can be transmitted to the ONUs through the modified PLOAM message in a normal working state of the ONU, and the EqD for the standby channel can be calculated.

Embodiment 2 when an ONU is in a normal working state, and protection switching is not triggered at this moment, a management information base is updated in an update mode of broadcast RTD$_A$, so that an updated equalization delay signal can be adopted directly when protection switching is started. In the embodiment, the process of quickly updating ranging results of the ONUs specifically comprises the following steps.

Step 301: when an ONU is in an O5 state, namely in a normal working state, a standby OLT acquires RTD$_A$ related to a trunk optical fiber length difference between a primary channel and a standby channel according to the prior art.

Step 302: the OLT transmits a Ranging_time message modified for three times to all the ONUs in the form of a broadcast message, wherein the Ranging_time message comprises the RTD$_A$.

Step 303: the ONU calculates an equalization delay signal corresponding to the standby channel through the formula of Eqd$_{standby}$=Eqd$_{primary}$+RTD$_A$ according to the RTD$_A$ included in the received Ranging_time message and an equalization delay signal corresponding to the primary channel used by the ONU originally.

Step 304: the ONU updates the equalization delay signal corresponding to the standby channel in a management information base; and after protection switching is started, the updated equalization delay signal corresponding to the standby channel is enabled.

Embodiment 3 when ONUs are in a normal working state, and protection switching is not triggered at this moment, a management information base is updated in an update mode of a unicast EqD, so that an updated equalization delay signal can be adopted directly when protection switching is started. In the embodiment, the process of quickly updating ranging results of ONUs specifically comprises the following steps.

Step 401: when an ONU is in an O5 state, namely in a normal working state, a standby OLT acquires $RTD_A$ related to a trunk optical fiber length difference between a primary channel and a standby channel according to the prior art.

Step 402: the OLT calculates an equalization delay signal of each ONU corresponding to the standby channel, and transmits a Ranging_time message modified for three times to each ONU in the form of a unicast message, wherein the Ranging_time message comprises an equalization delay signal corresponding to each ONU calculated by the OLT.

Step 403: the ONU receives the unicast Ranging_time message and parses out the equalization delay signal included in the Ranging_time message and corresponding to the standby channel of the ONU.

Step 404: the ONU updates the equalization delay signal corresponding to the standby channel in a management information base; and after protection switching is started, the updated equalization delay signal corresponding to the standby channel is enabled.

A system for quickly updating ranging results of ONUs by an OLT comprises a distributing unit and an updating unit, wherein the distributing unit is used for distributing an acquired ranging difference to all the ONUs by the OLT, and the updating unit is used for implementing quick updating of ranging results of the ONU itself according to the acquired ranging difference by the current ONU.

Here, the distributing unit is further used for distributing acquired $RTD_A$ to all the ONUs by the OLT, wherein the $RTD_A$ is a round trip delay ranging difference between a primary channel and a standby channel.

Since the ONUs acquire the $RTD_A$ at different times, specific implementation of the distributing unit and the updating unit is different, which is elaborated in two situations below.

One situation is that the ONUs are in a ranging state after protection switching is triggered.

The distributing unit is further used for distributing the $RTD_A$ to all the ONUs in the form of a broadcast message by the OLT under the condition that the ONU is in a ranging state after protection switching is triggered.

The updating unit is further used for obtaining a current equalization delay signal corresponding to the standby channel according to the $RTD_A$ and an equalization delay signal corresponding to the primary channel before under the state of switching from the primary channel to the standby channel, and updating the equalization delay signal; and the formula of $Eqd_{standby}=Eqd_{primary}+RTD_A$ can be adopted; or the updating unit is further used for obtaining a current equalization delay signal corresponding to the primary channel according to the $RTD_A$ and an equalization delay signal corresponding to the standby channel before under the state of switching from the standby channel to the primary channel, and updating the equalization delay signal; and the formula of $Eqd_{primary}=Eqd_{standby}+RTD_A$ can be adopted.

The other situation is that the ONUs are in a normal working state.

The distributing unit is further used for distributing the $RTD_A$ to all the ONUs in the form of a broadcast message by the OLT under the condition that the ONU is in a normal working state.

The updating unit is further used for obtaining a current equalization delay signal corresponding to the standby channel in advance according to the $RTD_A$ and an equalization delay signal corresponding to the primary channel before, and updating a management information base; and enabling the updated equalization delay signal after the protection switching from the primary channel to the standby channel is triggered. The formula of $Eqd_{standby}=Eqd_{primary}+RTD_A$ can be adopted; or the updating unit is further used for obtaining a current equalization delay signal corresponding to the primary channel in advance according to the $RTD_A$ and an equalization delay signal corresponding to the standby channel before, and updating a management information base; and enabling the updated equalization delay signal after the protection switching from the standby channel to the primary channel is triggered. The formula of $Eqd_{primary}=Eqd_{standby}+RTD_A$ can be adopted.

The value of the Round Trip Delay mentioned above is abbreviated as RTD; and the equalization delay signal is abbreviated as EqD.

All the above are only preferred embodiments of the disclosure but not limits the protection scope of the disclosure.

What is claimed is:

1. A method for updating ranging results of Optical Network Units (ONUs) by an Optical Line Terminal (OLT), comprising:
    distributing an acquired ranging difference to all the ONUs by the OLT; and
    implementing updating of ranging result of a current ONU itself by the current ONU according to the acquired ranging difference;
    wherein the ranging difference comprises a round trip delay ranging difference $RTD_A$ between a primary channel and a standby channel;
    under the condition that the ONU is in a ranging state after protection switching is triggered, distributing the $RTD_A$ to all the ONUs by the OLT in the form of a broadcast message;
    wherein when the primary channel is switched to the standby channel, the process of implementing updating of the ranging result of the current ONU itself according to the $RTD_A$ comprises: obtaining a current equalization delay signal corresponding to the standby channel according to the $RTD_A$ and an equalization delay signal corresponding to the primary channel before, and updating the equalization delay signal; or
    when the standby channel is switched to the primary channel, the process of implementing updating of the ranging result of the current ONU itself according to the $RTD_A$ comprises: obtaining a current equalization delay signal corresponding to the primary channel according to the $RTD_A$ and an equalization delay signal corresponding to the standby channel before, and updating the equalization delay signal.

2. The method according to claim 1, further comprising: under the condition that the ONU is in a normal working state, distributing the $RTD_A$ to all the ONUs by the OLT in the form of a broadcast message.

3. The method according to claim 2, wherein the process of implementing updating of the ranging result of the current ONU itself according to the $RTD_A$ comprises: obtaining a current equalization delay signal corresponding to the standby channel in advance according to the $RTD_A$ and an equalization delay signal corresponding to the primary channel before, and updating a management information base; and enabling an updated equalization delay signal after the protection switching from the primary channel to the standby channel is triggered; or the process of implementing updating of the ranging result of the current ONU itself according to the $RTD_A$ comprises: obtaining a current equalization delay signal corresponding to the primary channel in advance according to the $RTD_A$ and an equalization delay signal corresponding to the standby channel before, and updating a management information base; and enabling an updated equalization delay signal after the protection switching from the standby channel to the primary channel is triggered.

4. The method according to claim 3, wherein the broadcast message comprises a modified Ranging_time message or a custom dedicated message.

5. The method according to claim 2, wherein the broadcast message comprises a modified Ranging_time message or a custom dedicated message.

6. The method according to claim 1, wherein the broadcast message comprises a modified Ranging_time message or a custom dedicated message.

7. A system for updating ranging results of Optical Network Units (ONUs) by an Optical Line Terminal (OLT), comprising a distributing unit and an updating unit, wherein
the distributing unit is configured to distribute an acquired ranging difference to all the ONUs by an OLT; and
the updating unit is configured to implement updating of ranging result of a current ONU itself by the current ONU according to the acquired ranging difference;
wherein the distributing unit is further configured to distribute an acquired $RTD_A$ to all the ONUs by the OLT;
wherein the $RTD_A$ comprises a round trip delay ranging difference between a primary channel and a standby channel;
the distributing unit is further configured to distribute the $RTD_A$ to all the ONUs in the form of a broadcast message by the OLT under the condition that the ONU is in a ranging state after protection switching is triggered;
the updating unit is further configured to obtain a current equalization delay signal corresponding to the standby channel according to the $RTD_A$ and an equalization delay signal corresponding to the primary channel before under the state of switching from the primary channel to the standby channel, and update the equalization delay signal; and
the updating unit is further configured to obtain a current equalization delay signal corresponding to the primary channel according to the $RTD_A$ and an equalization delay signal corresponding to the standby channel before under the state of switching from the standby channel to the primary channel, and update the equalization delay signal.

8. The system according to claim 7, wherein the distributing unit is further configured to distribute the $RTD_A$ to all the ONUs in the form of a broadcast message by the OLT under the condition that the ONU is in a normal working state.

9. The system according to claim 8, wherein the updating unit is further configured to obtain a current equalization delay signal corresponding to the standby channel in advance according to the $RTD_A$ and an equalization delay signal corresponding to the primary channel before, and update a management information base; and enable an updated equalization delay signal after the protection switching from the primary channel to the standby channel is triggered; and the updating unit is further configured to obtain a current equalization delay signal corresponding to the primary channel in advance according to the $RTD_A$ and an equalization delay signal corresponding to the standby channel before, and update a management information base; and enable an updated equalization delay signal after the protection switching from the standby channel to the primary channel is triggered.

10. An Optical Line Terminal (OLT), configured to acquire a ranging difference and distribute the ranging difference to all the Optical Network Units (ONUs), wherein the ranging difference comprises a round trip delay ranging difference between a primary channel and a standby channel;
the OLT is configured to distribute the ran difference $RTD_A$ to all the ONUs in the form of a broadcast message under the condition that the ONU is in a ranging state after protection switching is triggered;
wherein when the primary channel is switched to the standby channel, the $RTD_A$ and an equalization delay signal corresponding to the primary channel before is used for obtaining a current equalization delay signal corresponding to the standby channel and updating the equalization delay signal; or
when the standby channel is switched to the primary channel, the $RTD_A$ and an equalization delay signal corresponding to the standby channel before is used for obtaining a current equalization delay signal corresponding to the primary channel and updating the equalization delay signal.

11. The optical line terminal according to claim 10, wherein the OLT is configured to distribute the ranging difference $RTD_A$ to all the ONUs in the form of a broadcast message under the condition that the ONU is in a normal working state.

12. An Optical Network Unit (ONU), configured to receive a ranging difference and implement updating of ranging result of a current ONU itself according to the ranging difference;
wherein the ranging difference comprises a round trip delay ranging difference between a primary channel and a standby channel;
the ONU is configured to receive the $RTD_A$ to all the ONUs by the OLT in the form of a broadcast message under the condition that the ONU is in a ranging state after protection switching is triggered;
the ONU is configured to obtain a current equalization delay signal corresponding to a standby channel according to the ranging difference $RTD_A$ and an equalization delay signal corresponding to a primary channel before under the state of switching from the primary channel to the standby channel, and update the equalization delay signal; and
the ONU is configured to obtain a current equalization delay signal corresponding to the primary channel according to the ranging difference $RTD_A$ and an equalization delay signal corresponding to the standby channel before under the state of switching from the standby channel to the primary channel, and update the equalization delay signal.

13. The optical network unit according to claim 12, wherein the ONU is further configured to obtain a current equalization delay signal corresponding to the standby channel in advance according to the ranging difference $RTD_\Delta$ and an equalization delay signal corresponding to the primary channel before, and update a management information base; and enable an updated equalization delay signal after protection switching from the primary channel to the standby channel is triggered; and     the ONU is further configured to obtain a current equalization delay signal corresponding to the primary channel in advance according to the ranging difference $RTD_\Delta$ and an equalization delay signal corresponding to the standby channel before, and update a management information base; and enable an updated equalization delay signal after protection switching from the standby channel to the primary channel is triggered.

* * * * *